(12) United States Patent
De Filippis et al.

(10) Patent No.: US 6,924,570 B2
(45) Date of Patent: Aug. 2, 2005

(54) STATOR FOR AN ELECTRIC MOTOR

(75) Inventors: Pietro De Filippis, Milan (IT); Joachim Gilly, Estenfeld (DE); Harald Redelberger, Kuernach (DE); Hermann Schulz, Kleinlangheim (DE)

(73) Assignee: Siemens Aktiengesellschaft, Munich ( * ) Notice: Subject to any disclaimer, the term of this patent is extended or adjusted under 35 U.S.C. 154(b) by 0 days.

(21) Appl. No.: 10/968,155

(22) Filed: Oct. 20, 2004

(65) Prior Publication Data

US 2005/0088049 A1 Apr. 28, 2005

(30) Foreign Application Priority Data

Oct. 22, 2003 (EP) .............................. 03023996

(51) Int. Cl.[7] .............................................. H02K 7/00
(52) U.S. Cl. ....................................... 310/71; 310/260
(58) Field of Search ........................ 310/71, 260, 254, 310/258, 259

(56) References Cited

U.S. PATENT DOCUMENTS 6,127,760 A * 10/2000 Nagasaki et al. ........... 310/254
6,333,579 B1 * 12/2001 Hirano et al. ............... 310/194
6,583,529 B2 * 6/2003 Suzuki et al. ............... 310/199
6,707,186 B2 * 3/2004 Oppitz ......................... 310/71
2003/0090166 A1 5/2003 Kobayashi et al.

FOREIGN PATENT DOCUMENTS

| DE | 10045471 A1 | 4/2002 |
| EP | 077312 A2 | 6/1997 |
| WO | WO03/001647 A1 | 1/2003 |

OTHER PUBLICATIONS

Derwent Abstract—EP–0777312A2; Jun. 4, 1997; ebm Werke GmbH & Co., D–74673 Mulfingen (Germany).
Derwent Abstract—DE 10045471A1; Apr. 4, 2002; Miele & Cie, GmbH & Co. D–33332 Gütersloh (Germany).

* cited by examiner

Primary Examiner—Dang Le
(74) Attorney, Agent, or Firm—Jacob Eisenberg; Siemens AG

(57) ABSTRACT

The invention relates to a stator for an electric motor. Said stator has an annular stator package having a plurality of stator teeth. An annular interconnection unit is located on the end face of said stator package. Said annular interconnection contains diverting elements. The interconnection unit has a support component which is provided with a cavity and has slots. Provided in said cavity are a multiplicity of mutually electrically insulated connector rings each having contacting elements routed externally through said slots.

16 Claims, 4 Drawing Sheets

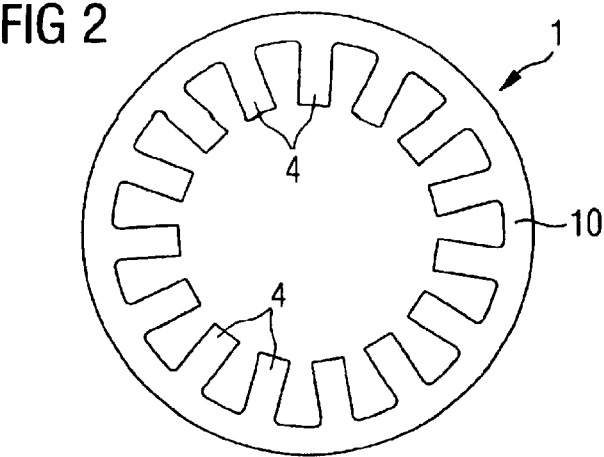
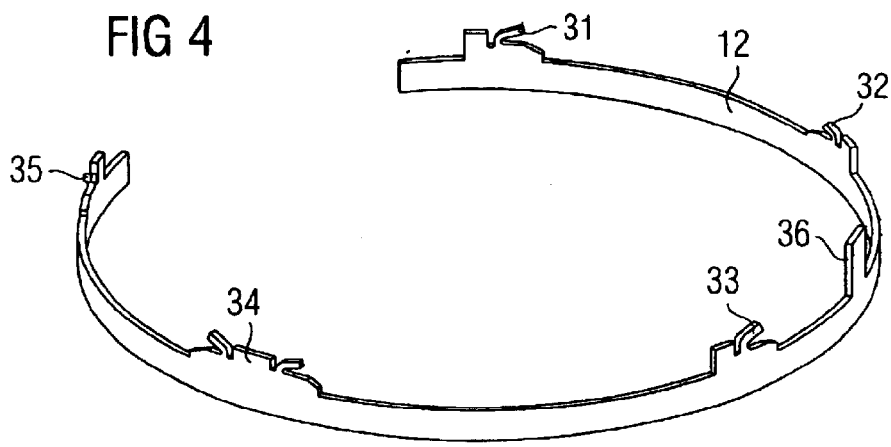
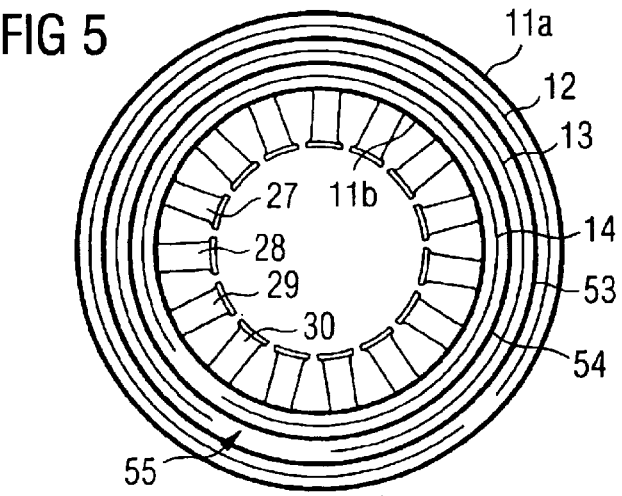

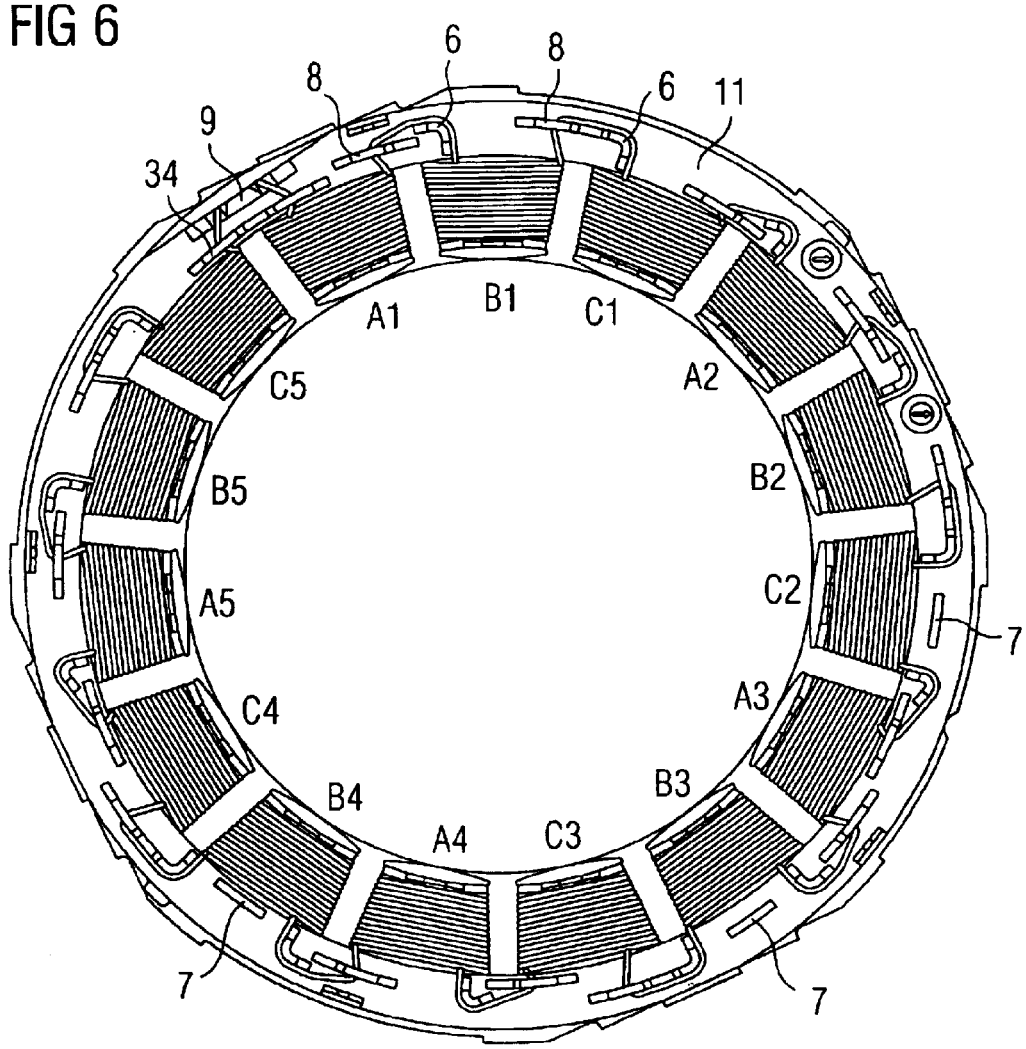

STATOR FOR AN ELECTRIC MOTOR

CROSS REFERENCE TO RELATED APPLICATIONS

The present application claims priority to priority European patent application EP03 023 996.6, filed on Oct. 22, 2003 which is herein incorporated by reference.

BACKGROUND OF THE INVENTION

The invention relates to a stator for an electric motor.

To ensure the functioning of an electric motor it is necessary, inter alia, for the coils associated with the motor's stator to be interconnected in a certain manner. The nature and manner of said interconnecting is defined by the stator's winding scheme and determines the motor's underlying functioning principle. For example, the winding scheme can describe a star-configured connection or a delta-configured connection for the coils. Wiring will be highly complex if the stator has a multiplicity of coils requiring to be interconnected because the respective coils have to be interconnected in a certain manner by means of single wires.

A stator for electric motors is already known from DE 100 45 471 A1. A stator winding consisting of several winding phases is here drawn into the stator slots of a stator core. The winding phases' wire beginnings and ends exiting from the slot are directly routed to at least one contacting device secured to the stator core and are connected to said device. All the terminal ends of the wires exit from the stator slots at the respective slot base. An interconnection support is furthermore located on the stator. Said support is provided for guiding the terminal ends of the wires to the contacting device. The interconnection support has an essentially annular ducting plate which is located on the stator core and provided with diverting and guide elements, for example hooks and bridges. The interconnection support furthermore includes contact cavities shaped to the ducting plate which are combined into connection areas. A first of said connection areas is embodied as a socket for producing the external motor terminal. A second of these connection parts located opposite the first connection part on the ducting plate is used to produce the internal electrical connections of the individual winding phases. In this prior art, too, the coils or, as the case may be, winding phases have to be interconnected by means of single wires.

A stator for electric motors which has an interconnection arrangement, located on an end face, for the stator winding is furthermore known from the document EP 0777 312 A2. Said interconnection arrangement has an insulating part having slot-shaped cavities for accommodating mutually electrically insulated connecting conductors for interconnecting the winding-wire ends of the stator winding.

Said interconnection arrangement is placed over the winding overhang of the previously fully installed stator winding and is connected to the stator via pins or further insulating parts. This gives rise to additional overall height across which the coil wires for contacting with the connecting conductors also have to be routed.

SUMMARY OF THE INVENTION

The object of the invention is to describe a stator for an electric motor, in which stator the interconnection of the coils is improved owing in particular also to short installation routes and defined guiding of the coil-wire ends to the contacting means.

Said object is achieved by means of a stator having the features of claim 1. Advantageous embodiments and developments of the invention will emerge from the dependent claims.

The advantages of the invention are due especially to the stator's having a simpler physical design than in the prior art. In particular, there is no need for complicated interconnecting of individual coils using single wires. The hitherto customary soldering and other wire-connecting methods difficult in process engineering terms are dispensed with, being replaced by simple resistance welding.

A further advantage of the invention is that the stator's overall end-face height is reduced as loose wires no longer have to be bundled owing to the contacting by means of connector rings which is provided according to the invention. The stator's maximum dimensions can be exactly defined. Precisely defined welding locations and diverting elements virtually rule out the risk of loose wires. Thanks to pre-specified, exact wire guiding, process reliability is ensured during winding and welding when the stator is being produced. The risk of short-circuiting is greatly reduced.

Use is made here of an interconnection unit, called a termination ring, consisting of a plastic annular support component and connector rings housed therein. Said termination ring is preferably a one-piece annular plastic molded component, produced by means of injection molding, having connector rings which are inserted or plugged into a cavity of the support component and which are mutually insulated by means of partitions protruding into said cavity and located between said connector rings. The support component is provided on its internal side with winding support elements directly adjoining the stator teeth of the stator package and enclosed by the respective individual tooth winding together with said stator teeth. A plastic molded component of said type can be produced in a simple manner by means of plastic injection molding.

BRIEF DESCRIPTION OF THE SEVERAL VIEWS OF THE DRAWINGS

Further advantageous features of the invention will emerge from the exemplary explanation thereof with reference to the figures, in which:

FIG. 2 is a schematic plan view of the stator's non-wound annular stator package, FIG. 4 is a perspective representation of a connector ring, FIG. 5 is a sketch clarifying the insertion of the connector rings into the cavity of the support component, and FIG. 6 is a plan view of a stator already provided with windings.

DETAILED DESCRIPTION OF THE INVENTION

Figure 1:
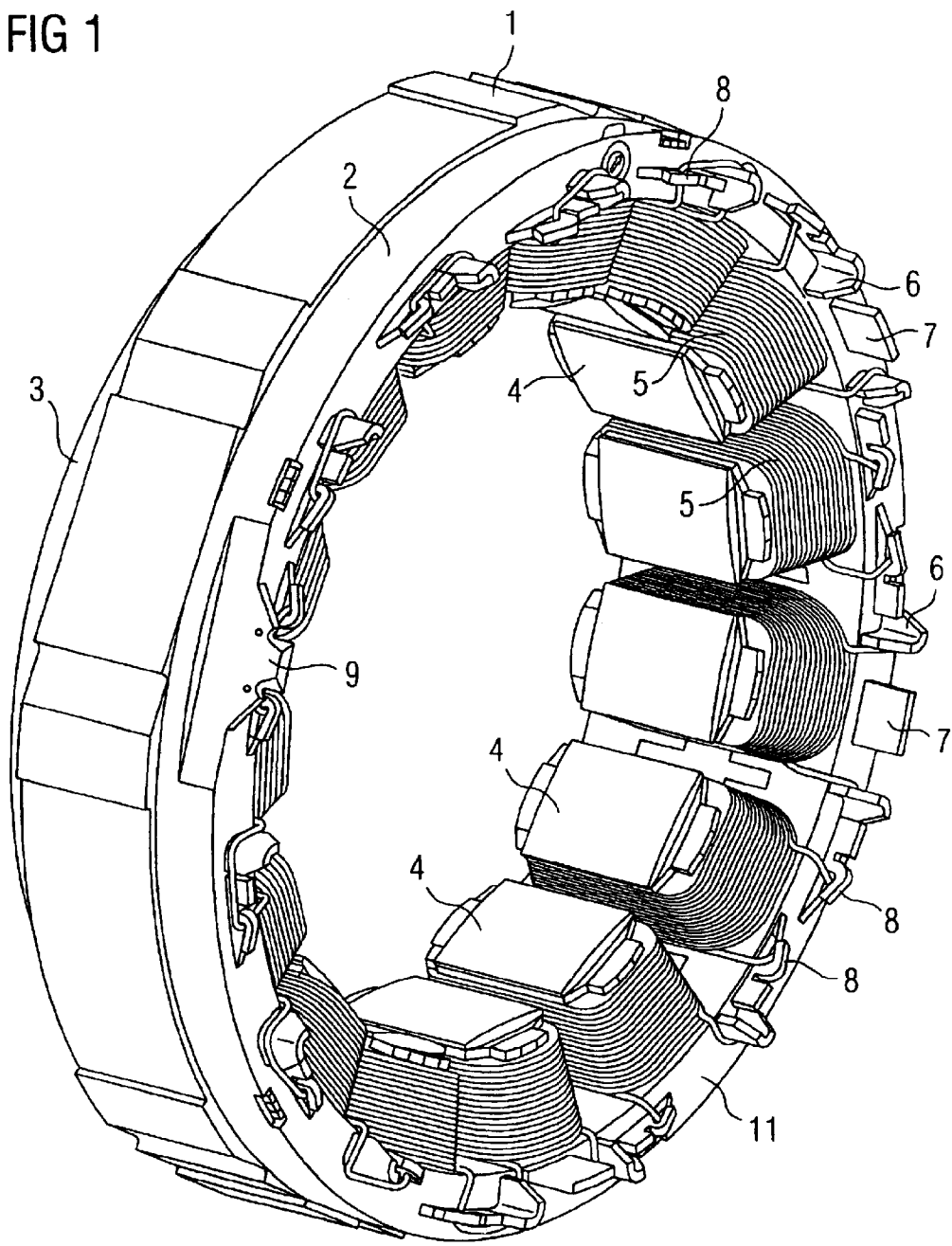
FIG. 1 is a perspective view of a stator according to the invention.

FIG. 1 is a perspective view of a stator according to the invention. The stator shown has an annular stator package 1 provided with a plurality of inwardly extending stator teeth. Some of said stator teeth are identified in the figure by the reference number 4. Each of these stator teeth has an individual tooth winding 5. On its front end face the stator shown furthermore has an annular interconnection unit 2 whose structure is explained below with reference to FIG. 3. Said interconnection unit 2 has, inter alia, a support component 11 provided with diverting elements 6 and a multiplicity of slots through which contacting elements 7 and 8 are externally routed. The interconnection unit 2 also has a wire-guide element 9. Said element is provided with two notches for accommodating the beginning and end of the winding wire. On its rear end face the stator shown furthermore has an insulating ring 3 or, alternatively,—for example if there is a star-configured connection—a further interconnection unit.

FIG. 2 is a schematic plan view of the stator's annular stator package 1 before it has been wound. It can be seen that the stator package shown has an annular support 10 proceeding from which the stator teeth extend outward. Some of said stator teeth are identified by the reference number 4. A total of 15 stator teeth 4 are provided in the exemplary embodiment shown. A delta-configured connection, for instance, of the stator coils is implemented by means of a stator package of said type, with—as will be explained—the electrical contacting of the stator windings 5 being realized using connector rings 12, 13, and 14 located in a cavity of the support component 11 and having the contacting elements 7 and 8 shown in FIG. 1.

Figure 3:
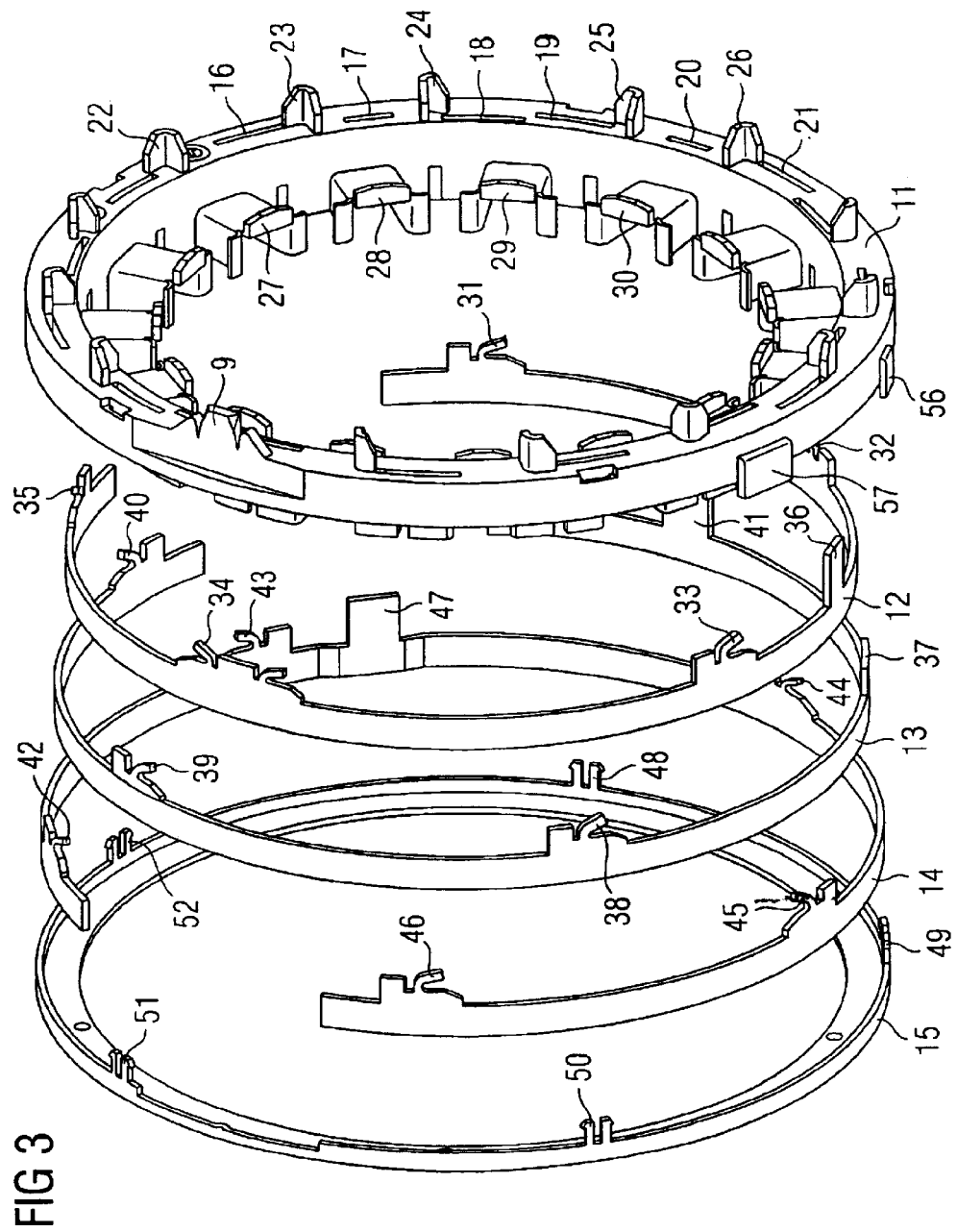
FIG. 3 is a clarifying representation of the components of an interconnection unit according to the invention.

FIG. 3 is a clarifying representation of the components of the interconnection unit 2 located on the front end face of the stator package. The interconnection unit 2 shown has a support component 11, a first connector ring 12, a second connector ring 13, a third connector ring 14, and a cover 15.

The support component 11 is a one-piece plastic molded component which can be produced by means of plastic injection molding. On its end face distant from the stator package the support component 11 has diverting elements some of which are identified in FIG. 3 by the reference numbers 22, 23, 24, 25, and 26. In the vicinity of each diverting element the support component 11 further has a slot provided for guiding through one of a connector ring's contacting elements. Some of these slots are identified in FIG. 3 by the reference numbers 16, 17, 18, 19, 20, and 21. The support component 11 furthermore has a wire-guide element 9 with two notches. Said notches are provided for accommodating or, as the case may be, guiding the beginning and end of the winding wire. Finally, the support component 11 is provided on its internal side with inwardly extending winding support elements some of which are identified in FIG. 3 by the reference numbers 27, 28, 29, and 30. Said winding support elements directly adjoin the stator teeth 4 of the stator package 1 in the assembled stator and are enclosed by the winding, together with said stator teeth, when the winding is applied. Said winding support elements also serve as slot-insulating elements. They furthermore prevent the winding from slipping off the respective stator tooth and also promote even winding to ensure optimal use of the space for the wires, thereby achieving an increase in fill level.

The support component 11 shown in FIG. 3 is further provided with orientation plates 56 and 57. Said plates serve to correctly position the termination ring on the stator package.

On its end face facing the stator package the support component 11 furthermore has a cavity into which the connector rings 12, 13, and 14 shown in FIG. 3 are inserted. Said connector rings are made of an electrically conducting material, for example tin-coated copper. As explained below in connection with FIG. 5, said connector rings are mutually electrically insulated within the cavity of the support component 11. In the exemplary embodiment shown, this electrical insulation is provided by means of partitions that are components of the support component 11 implemented as a plastic molded component.

Each of the connector rings 12, 13, 14 has contacting elements which protrude externally through the slots on the end face of the support component 11, for example the slots 16–21, when the connector ring has been inserted into the support component 11. A distinction is made here between first contacting elements 8 and second contacting elements 7. The first contacting elements 8 serve for internal contacting, which is to say to electrically contact one of the windings 5 of the stator with a required further winding 5 of said stator. Said first contacting elements 8 are embodied as contacting hooks. The second contacting elements 7 serve for external contacting, which is to say to contact the respective connector ring 12, 13, and 14 with an external electronic system or an external power supply. The second contacting elements 7 are embodied as connector tabs.

It can be seen from FIG. 3 that the connector ring 12 has first contacting elements 31, 32, 33, 34, and 35 and is furthermore provided with a second contacting element 36 realized as a connector tab. The connector ring 13 has first contacting elements 37, 38, 39, 40 and a further first contacting element which is obscured in FIG. 3 by the support component 11. The connector ring 13 is furthermore provided with a second contacting element 41 realized as a connector tab. The connector ring 14 has first contacting elements 42, 43, 44, 45, and 46 and is furthermore provided with a second contacting element 47 realized as a connector tab.

When the connector rings 12, 13, 14 have been inserted into the cavity of the support component 11, said cavity is then closed by means of the cover 15. For this purpose the cover, which is a plastic molded component, has clips 48, 49, 50, 51, and 52 which latch into respectively associated slots of the support component 11 when the interconnection unit 2 is closed. The cover 15 serves to electrically insulate the interconnection unit 2 from the stator package 1 and additionally to strengthen the entire interconnection unit 2.

FIG. 4 is a perspective representation of the connector ring 12 already shown in FIG. 3, with said connector ring being shown again separately for better clarity. It is particularly apparent from the figure that the first contacting elements 31, 32, 33, 34, and 35 are embodied as hooks. As explained below in connection with FIG. 6, a winding wire is guided by each of said hooks. The electric conductor located in the winding wire is electrically contacted, as required, with respective hook, which is a component of the connector ring 12 made of a conducting material, using a resistance-welding process. The winding wire's sheath is melted during said process and a weld joint produced thereby which provides the required electrical contact between the winding wire's conductor and the contacting element.

The hook 34 shown in FIG. 4 is a double hook through which a total of two winding wires are guided which are the beginning and end of the stator winding. Said two winding wires are likewise electrically connected by means of a resistance-welding process to the hook 34 and hence to the connector ring 12.

Also apparent from FIG. 4 is the second contacting element 36, realized in the form of a connector tab, of the connector ring 12, said contacting element being provided for externally contacting the connector ring or, as the case may be, stator.

FIG. 5 is a sketch clarifying from below the connector rings 12, 13, and 14 inserted into the cavity 55 of the support component 11. The cavity 55 is laterally bounded by the outer side wall 11a and the inner side wall 11b of the support component 11. The support component's winding support elements extend inward from the inner side wall 11b. Some of said winding support elements are identified in FIG. 5 by the reference numbers 27, 28, 29, and 30. Partitions 53 and 54 made of electrically non-conducting material, preferably plastic material, are provided within the cavity 55. These extend parallel to the side walls 11a and 11b of the support component 11 and, preferably together with said support component, form a one-piece plastic molded component that can be produced by injection molding. The connector rings 12, 13, and 14 are mutually electrically insulated by the cited partitions 53 and 54.

FIG. 6 is a plan view of a stator already provided with windings. All the coils shown in FIG. 6 are wound from a single wire. The beginning of the wire is guided from outside through one of the notches of the wire-guide element 9 of the termination ring, then wound via the contacting elements 34 onto the stator tooth located there, whereby the coil A1 is formed. The end of the wire of the coil A1 is guided via one of the first contacting elements 8 provided on the termination ring and a following diverting element 6, and then forms the beginning of the wire of the coil B1 formed by winding of the wire on the adjacent stator tooth. The end of the wire of the coil B1 is guided via a further first contacting element 8 and a following diverting element 6 and then forms the beginning of the wire of the coil C1, etc. The end of the wire of the coil C5 is finally guided back to the outside via the other notch of the wire-guide element 9. All the windings of the stator can consequently be produced by means of a single winding wire. The required electrical contacting of the stator's coils is produced using a resistance-welding process in the area of the respective first contacting element.

The coils form a delta-configured connection in the exemplary embodiment shown, with the coils A1, A2, A3, A4, and A5 forming one side of the triangle, the coils B1, B2, B3, B4, and B5 forming a second side of the triangle, and the coils C1, C2, C3, C4, and C5 forming the third side of the triangle. The coils are here internally interconnected via the first contacting elements 8, which are each a component of one of the connector rings located in the cavity of the support component 11; they are externally interconnected via the connector tabs 7, each of which is a component of one of the connector rings.

Other types of connection can be implemented as alternatives to the above exemplary embodiment: the coils can be connected in a star configuration, for example, or in series or in parallel. This only requires suitably selecting the number of connector rings, providing said rings with the number of contacting elements and positioning thereof that are dependent on connection type, and positioning the slots in the support component 11 in keeping with the required connection type.

If the number of internal interconnections becomes very large, a further interconnection unit can then be located on the stator's rear end face instead of an insulating ring 3 provided for slot insulating.

A stator according to the invention can, according to all the preceding, be constructed in a simple manner. There is no need for complicated interconnections between the individual coils using single wires. The wire connecting that is required in known solutions and which is difficult in process engineering terms is dispensed with, being replaced by simple resistance welding.

Owing to the internal coil contacting using connector rings the stator's end-face height is reduced considerably as loose wires no longer have to be bundled. The stator's maximum dimensions can be exactly defined. Precisely defined welding locations and wire-diverting elements virtually rule out the risk of loose wires.

Process reliability is improved when the stator is being produced thanks to exact wire guiding during winding and welding. The risk of short-circuiting is greatly reduced.

The connector rings used for the invention can be produced by means of a punching process followed by bending. It must be noted in this connection that handling precision is crucial. Ensuing precise positioning is ensured by the slots in the support component 11.

The required plastic components, namely the support component 11, the cover 15, and the insulation 3, are preferably produced by means of injection molding. Injection molding is a tried-and-tested method ensuring a high degree of process reliability coupled with low costs.

The dimensions of the connector rings 12, 13, 14 can be suitably selected as required in keeping with the prevailing current and voltage conditions. In the above exemplary embodiment the connector rings 12, 13, 14 are embodied as "standing" on the stator yoke, which is to say arranged axially parallel to the motor shaft. It is readily alternatively possible to arrange the connector rings as "lying" on the stator yoke, which is to say positioned at right angles to the motor shaft.

The electric machine formed using the stator exhibits little susceptibility to mechanical impacts and vibrations. Susceptibility to oxidation is reduced owing to the absence of dirt traps in wire crossovers.

Ohmic losses can be reduced through the use of copper as the material for the connector rings.

The connector rings can be embodied in such a way that asymmetric contacting is possible with an electronic system integrated in the drive from the symmetric winding arrangement on the stator's circumference. Despite the asymmetric interface to the electronic system, current asymmetries in the operation of the drive can therefore be effectively avoided thanks to the embodiment of the connector rings as copper parts.

The coils are internally interconnected as described with a negligible reduction in efficiency. This is especially necessary in the case of low-voltage and hence high-current applications in order to keep the drive's overall efficiency within a required range. There is an example of an application of said type in motor vehicles having a 12V electrical distribution systems.

An electric machine is assembled by, for example, contacting the motor housing having a stator installed with the appropriate terminals of the external electronic system or external power supply via the stator's connector tabs, with its being possible for said external electronic system to be secured into position in the motor cover. This connection using connector tabs can advantageously be carried out quickly, simply, and non-destructively as and when required. This simplifies repair work and corrective adjustments and is more compatible than previously known solutions with recent environmental requirements.

What is claimed is:

1. Stator for an electric motor comprising:

an annular stator package having a plurality of inwardly extending stator teeth with an individual tooth winding;

an annular interconnection unit located on an end face of the stator package and provided on its end face distant from the stator package with diverting elements, the annular interconnection unit further comprising an electrically non-conducting support component having a cavity wherein a plurality of mutually electrically insulated connector rings are arranged, each of the rings including a contacting element, which is externally routed through slots in the support component; and wherein the support component has inwardly extending winding support elements which directly adjoin the stator teeth, are embodied as slot-insulating elements, and have extrusions preventing the individual tooth windings from slipping off a respective stator tooth.

2. The stator according to claim 1, wherein the support component is a plastic molded component having partitions that project into the cavity, the partitions arranged to provide electric insulation to the connector rings.

3. The stator according to claim 2, wherein each connector ring comprises first contacting elements arranged to provide internal interconnecting windings mounted onto the stator teeth.

4. The stator according to claim 1, wherein each connector ring comprises first contacting elements arranged to provide internal interconnecting windings mounted onto the stator teeth.

5. The stator according to claim 4, wherein an end of a winding is routed via one of the diverting elements so as to form a start of an adjacent winding.

6. The stator according to claim 5, wherein each diverting element is assigned one of the first contacting elements routed externally through a slot of the support component, a winding wire routed via the diverting element is routed via the first contacting element assigned to the diverting element, and electrical contacting of the first contacting element with electrical conductor located inside the wire is produced by a resistance-welding process.

7. The stator according to claim 6, wherein the first contacting elements comprise hooks.

8. The stator according to claim 5, wherein the first contacting elements comprise hooks.

9. The stator according to claim 4, wherein the first contacting elements comprise hooks.

10. The stator according to claim 4, wherein each connector ring comprises a second contacting element arranged to interconnect with an external electronic system or an external power supply.

11. The stator according to claim 10, wherein the annular interconnection unit is provided on its end facing the stator package with a cover made of non-conducting material.

12. The stator according to claim 1, wherein each connector ring comprises a second contacting element arranged to interconnect with an external electronic system or an external power supply.

13. The stator according to claim 12, wherein the second contacting elements are connector tabs.

14. The stator according to claim 1, wherein the annular interconnection unit is provided on its end face the stator package with a cover made of non-conducting material.

15. The stator according to claim 1, wherein on an end face distant from the interconnection unit an insulating ring or a second interconnection unit is arranged.

16. The stator according to claim 1, wherein on an end face distant from the interconnection unit an insulating ring or a second interconnection unit is arranged.

* * * * *